United States Patent [19]

Jones

[11] Patent Number: 5,485,299
[45] Date of Patent: Jan. 16, 1996

[54] COMMUNICATIONS SYSTEM

[75] Inventor: Kevan P. Jones, London, England

[73] Assignee: Northern Telecom Limited, Montreal, Canada

[21] Appl. No.: 269,569

[22] Filed: Jul. 1, 1994

[30] Foreign Application Priority Data

Jul. 31, 1993 [GB] United Kingdom ............ 9315903

[51] Int. Cl.⁶ .................................................. H04B 10/17
[52] U.S. Cl. ...................... 359/179; 359/177; 359/160; 359/341
[58] Field of Search ................................ 359/177, 179, 359/194, 195, 134, 160, 341

[56] References Cited

U.S. PATENT DOCUMENTS

| | | | |
|---|---|---|---|
| 4,963,832 | 10/1990 | Desurvire et al. | 330/4.3 |
| 5,008,958 | 4/1991 | Cimini, Jr. et al. | 359/192 |
| 5,115,338 | 5/1992 | DiGiovanni et al. | 359/337 |
| 5,128,801 | 7/1992 | Jansen et al. | 359/343 |
| 5,185,814 | 2/1993 | Healey | 385/24 |
| 5,299,048 | 3/1994 | Suyama | 359/179 |
| 5,355,248 | 10/1994 | Hadjifotiou | 359/341 |
| 5,363,385 | 11/1994 | Heidemann | 372/6 |
| 5,367,587 | 11/1994 | Mizuochi et al. | 385/27 |

FOREIGN PATENT DOCUMENTS

| | | |
|---|---|---|
| 2150703 | 3/1987 | United Kingdom . |
| 2273172 | 6/1994 | United Kingdom . |

*Primary Examiner*—Leo H. Boudreau
*Assistant Examiner*—Gregory Stephens
*Attorney, Agent, or Firm*—Lee, Mann, Smith, McWilliams, Sweeney & Ohlson

[57] ABSTRACT

In an amplified optical fibre transmission system the light received level at an optical fibre amplifier following transmission from a terminal is directly detected with minimum loss at the amplifier by means of a WDM/SKEW coupler, a detector and a pump source for the amplifier which is modulated in an on-off chopped manner. The received light level is measured at the detector when the pump is off.

5 Claims, 5 Drawing Sheets

COMMUNICATIONS SYSTEM

This invention relates to optical fibre communications systems including supervisory systems and in particular to supervisory systems for optical line amplifiers, especially but not exclusively for submarine optical fibre communications systems.

Submarine optical fibre communications systems currently under development include optical amplifier repeaters rather than 3R regenerators. In particular, the optical amplifiers are rare earth doped fibre amplifiers, specifically erbium doped fibre amplifiers. Long haul optical systems require remote monitoring and control as part of the network management of the system. This function is carried out by a supervisory system. The advent of optical amplifiers introduced a new set of issues relating to the implementation of the supervisory system. An essential feature of a long haul system is the ability to monitor remotely the performance of any repeater and to locate the cause of system degradation or fault to a particular repeater or cable section. With an optical amplifier system, unlike a regenerator system, this must be achieved without access to the baseband spectral content of the data signal.

The object of the invention is to provide a communications system having an improved supervisory facility.

According to the present invention there is provided an optical fibre communications system including a first terminal, an optical fibre amplifier having an input and an output, a first detector at the input for use in measuring the received level of light (RLL) at the optical fibre amplifier from the first terminal, and a pump source at the input for providing a pump signal to the optical fibre amplifier, wherein the detector and the pump source are coupled to the input by a coupler, and wherein means are provided whereby the pump is modulated in an on-off chopping manner and the RLL is measured when the pump is off.

Embodiments of the invention will now be described with reference to the accompanying drawings, in which FIG. 1 illustrates schematically an integrated supervisory system using gain modulation;

Figure 1:
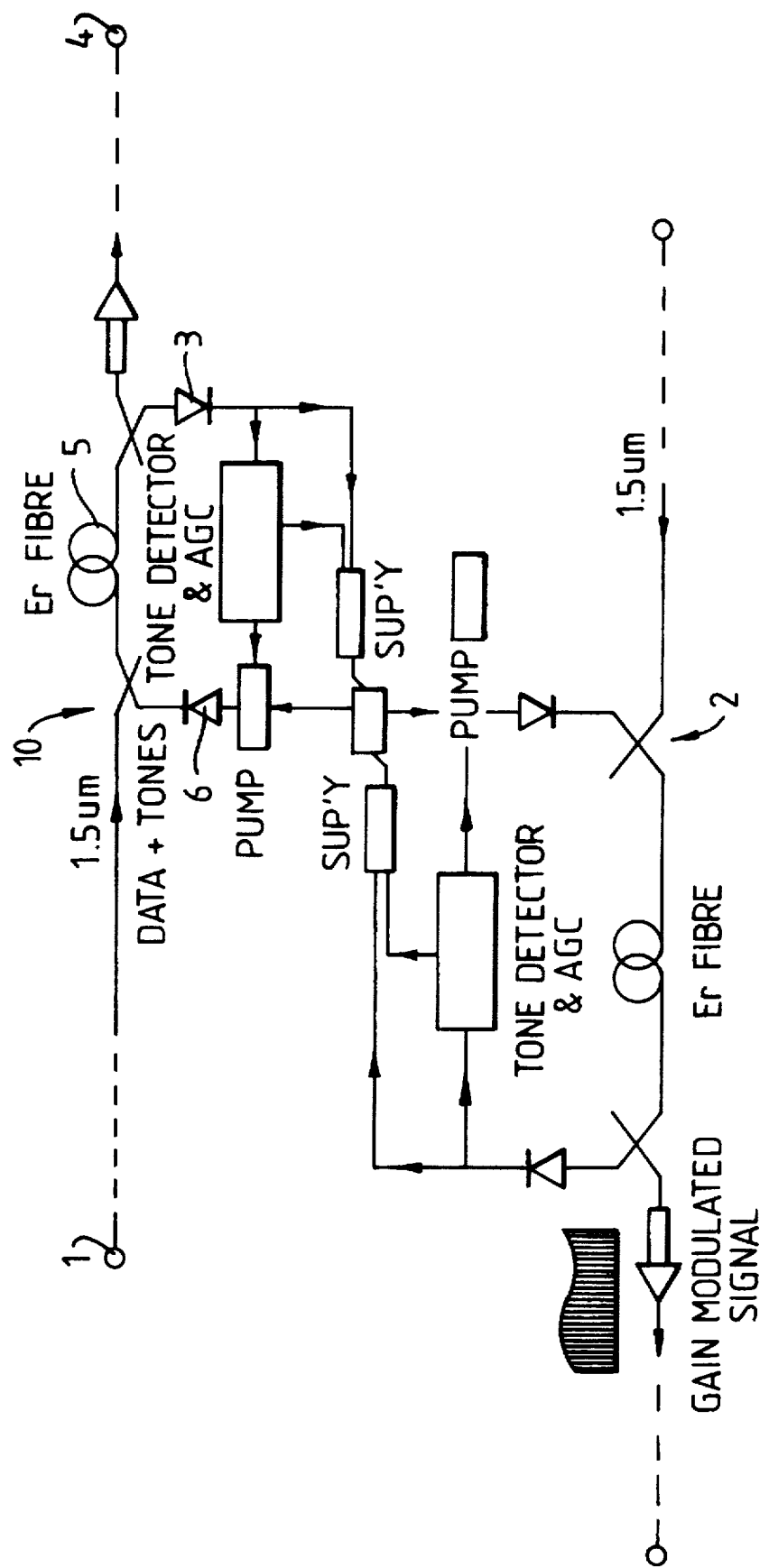

Referring firstly to FIG. 1 outbound signalling from a terminal 1 to a repeater 2 is achieved using a low level intensity modulated tone which is added to the data signal at the terminal. The low frequency tone is detected by a low frequency receiver 3 in the repeater 2. Inbound signalling from the repeater to a terminal 4 is achieved via amplifier gain modulation, the amplifier being erbium doped fibre 5. This is achieved by modulating the pump laser 6 current with the supervisory signal as detected, which in turn intensity modulates the output of the pump laser. Since the gain of the erbium doped fibre 5 depends on the pump level, any changes in pump laser power are imparted on the amplifier gain. Hence the high speed data sequence is subject to a variable gain resulting in an intensity modulation being imposed on it. This signal then propagates through any following amplifiers before being detected by a low frequency receiver in the terminal 4. As indicated in FIG. 1 the inbound signalling can be directed to either terminal.

A supervisory system for optical line amplifiers which allows various measurements of the performance of the amplifiers to be measured and sent to a terminal via the supervisory tone will now be described with reference to FIG. 2.

Figure 2:
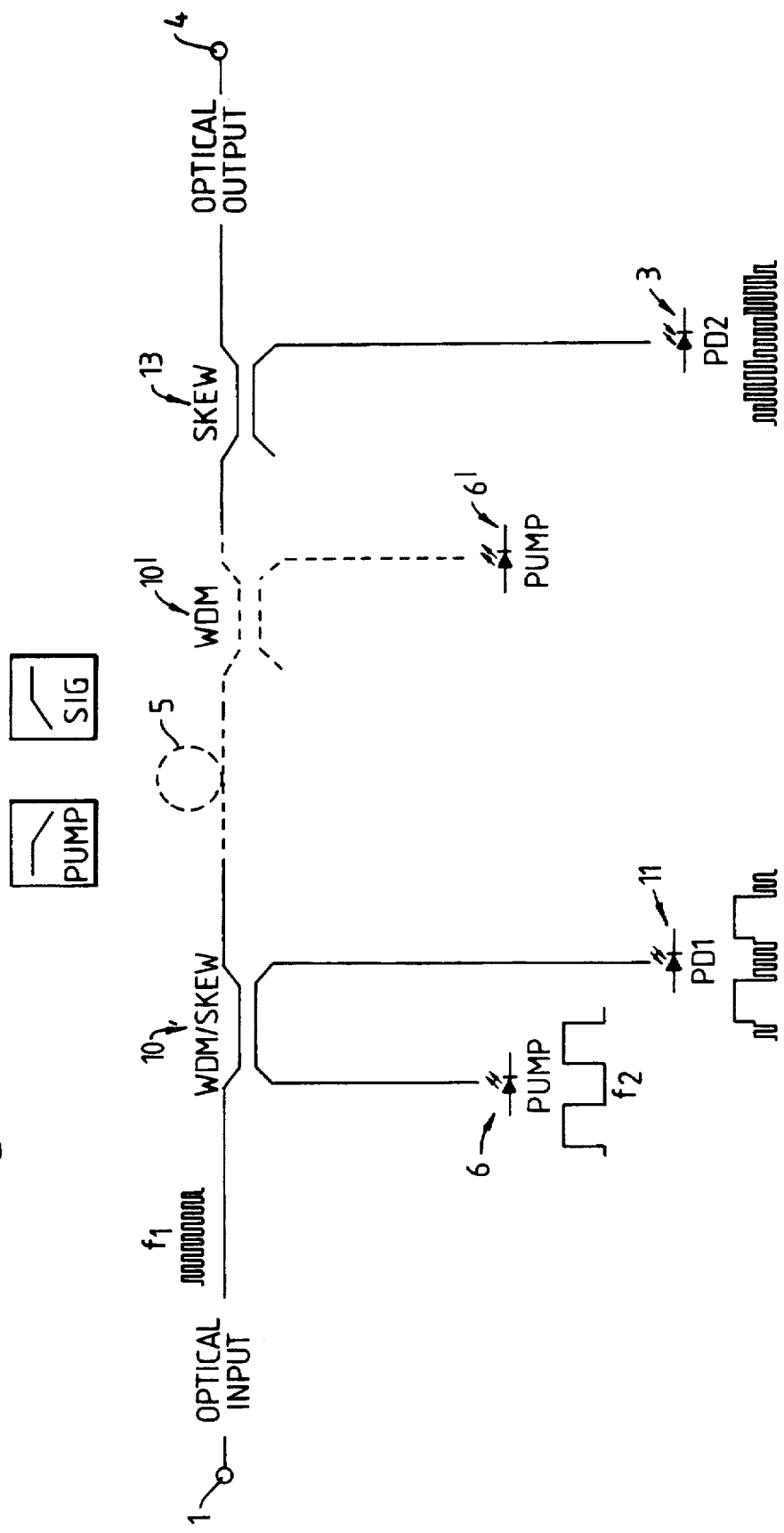
FIG. 2 illustrates schematically a supervisory measurement system for optical line amplifiers according to the present invention.

As will be appreciated from FIGS. 1 and 2 the pump signal for the erbium doped fibre amplifier 5 is applied thereto via a fibre optic coupler 10 to which is also applied the optical input, consisting of the data and the supervisory carrier tone. This coupler has a wavelength multiplexing coupler (WDM) function since the data signal and the pump signal are at different wavelengths. The pump may, for example, be at 1480 nm for a data signal of 1550–1560 nm. Whilst the coupler 10 is illustrated at the input end of the fibre amplifier i.e. the system is co-pumped, there are actually certain advantages if it is positioned at the output end of the fibre amplifier and the system is counter-pumped. A co-pumped amplifier is defined as one which has the pump power travelling in the same direction as the data signal. A counter-pumped amplifier is one in which the pump signal is travelling in the opposite direction to the data signal. A bi-pumped amplifier is also possible, i.e. one in which the amplifier is co-pumped and counter-pumped simultaneously. FIG. 2 also illustrates in dashed lines, the location of an optional pump 6' for counter-pumped or bi-pumped versions.

With these erbium fibre amplifiers it is important to keep their individual noise figures as low as possible so that when a number are concatenated together the best overall transmission performance is obtained. One means of achieving this is to reduce the additional excess loss at the input to the amplifier to as small a figure as possible and this can be achieved by having as few components as possible at the input to the amplifier. This can be achieved by counter-pumping i.e. putting the WDM 10 at the dashed option at the other end of fibre amplifier 5 as WDM 10', so that the loss of WDM 10' is at the output of the amplifier where it has less effect. However, this means that a worse noise figure actually results because of the population inversion profile of the fibre. Hence in practice, co-pumping results in a better noise figure despite the additional excess loss at the input. This point will be discussed in greater detail hereinafter with reference to FIGS. 3–5.

For monitoring in-service amplifiers reliably it is required to tap off a small proportion of the incoming light at both the input and output ends of the fibre amplifier, i.e. by means of photodetectors 11 and 3 respectively. In order to achieve this a particular type of fibre optic coupler, referred to in the drawings as SKEW may be employed. Suitable fibre optic couplers to perform a WDM and SKEW function which is required for coupler 10 and the SKEW function alone for coupler 13 are described in our co-pending Application No. 9225186.7 (A Fielding 10). The WDM/SKEW coupler 10 is a so-called non-total power wavelength multiplexing 2×2 coupler by means of which a pump signal can be combined with a data signal and say 95% of the resultant signal is applied to the erbium fibre amplifier and 5% applied to the photodetector 11. One component then achieves both the coupling and splitting required rather than two separate components and hence only a single excess loss is involved so that the net loss is small and the performance degradation is small. The SKEW coupler 13 may be a 2×2 tapered fused coupler made by the progressive stretching method of GB-B 2150703 but in which the extension is halted shortly after mutual lateral coupling has been established so that only a small proportion of any power coupling in either fibre is transferred to the other.

Figure 3:
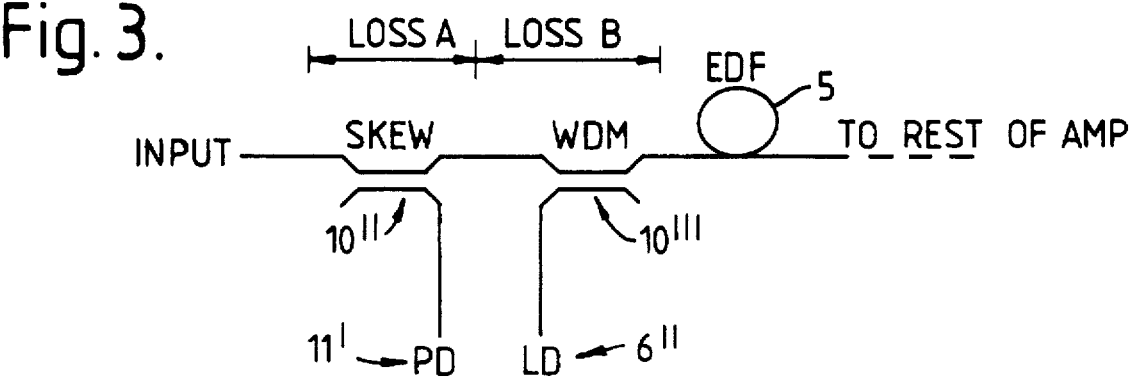
FIG. 3 illustrates a conventional input configuration for an optical amplifier.
Figure 4:
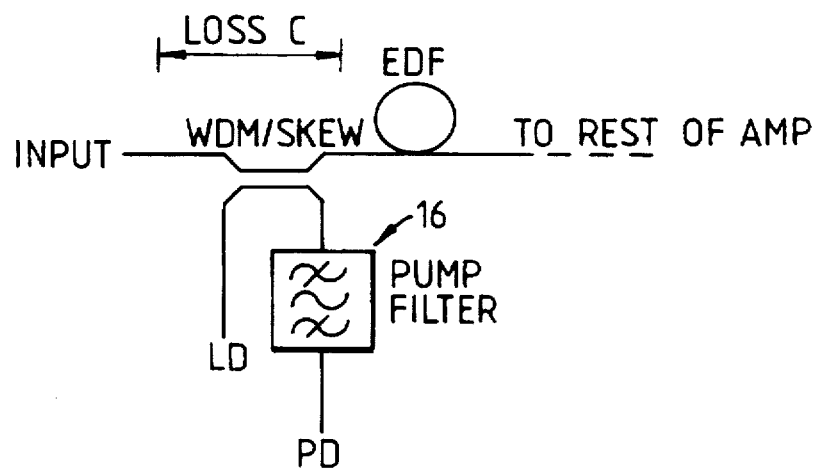
FIG. 4 illustrates a configuration with an optical filter.
Figure 5:
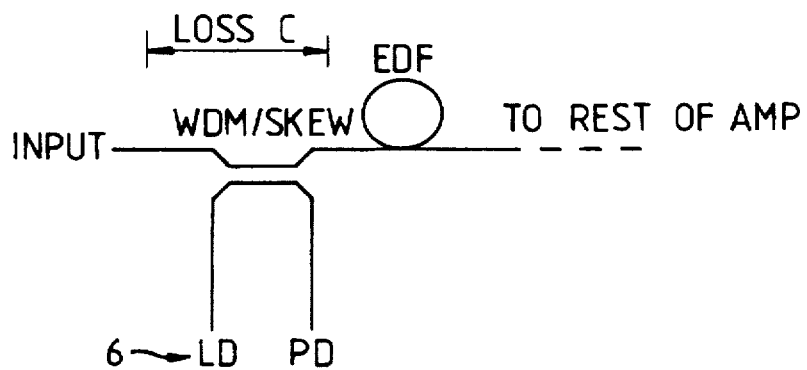
FIG. 5 illustrates the configuration employed in the present invention.

In a conventional co-pumped or bi-pumped optical amplifier, the input configuration illustrated in FIG. 3 is used. This shows a direct monitor facility (photodiode (PD) 11') of the received light level (RLL) to the amplifier (EDF)5 via a SKEW coupler 10" and the availability of a co-pump (LD) 6" coupled to the amplifier 5 via a WDM coupler 10'" for the best noise figure. The input loss to the amplifier 5 is loss A+loss B, which would typically be 0.5 dB. The SKEW coupler 10" can be removed to reduce the input loss, but the RLL monitor functionality is then lost. There are two possible ways to use a SKEW/WDM coupler to reduce the input loss to C (<<A+B). The first of these is illustrated in FIG. 4 and uses an optical filter 16 to remove the pump signal, which is at a much higher level than the data signal (possibly 30 dB), from the input light and then a direct measurement can take place. The optical filter 16, however, requires a very high specification to achieve this. The present invention obviates this requirement and is illustrated schematically in FIG. 5. On-off modulation of the pump laser (LD) 6 allows direct measurement of RLL when the pump is off and without requiring an optical filter and indeed will provide a better measurement, since the pump is totally removed and the signal to be measured sees no further attenuation. The lifetime stability of such a system should also be improved in view of the inherent stability of fused fibre couplers. The advantage of the FIG. 5 system is the optical stability. It allows direct RLL monitoring in the presence of a co-pump whilst minimising the excess loss at the input of the amplifier.

The use of the WDM/SKEW coupler 10 and the SKEW coupler 13 as illustrated in FIG. 2 thus means that a small proportion of the incoming light can be tapped off at both the input and output of the fibre amplifier 5. It will be appreciated, however, that when looking at the optical input signal on the incoming line, the data signal containing the supervisory carrier tone will be of the order of one tenth of a milliwatt, for a pump power of the order of ten milliwatts i.e. a 100 to one relationship. Thus if one attempts to measure the supervisory tone directly at the 5% tap off port of WDM/SKEW coupler 10 by photodetector 11, then the supervisory tone will be swamped by a continuous pump signal, which is in any event measured by a conventional back diode in the laser package providing the pump laser source 6. As mentioned above, the optical data signal is of the order of 1550 nm and the erbium doped fibre amplifier acts as a high pass filter to modulation on the optical data signal. However it will act as a low pass filter to pump modulation. Low frequency pump modulation causes gain modulation of the amplifier and therefore the signal appears at the output of the amplifier. It should be noted that if the pump laser were to be modulated very very quickly, no modulation would be detected at the amplifier output at all in view of the long time constant of the erbium. Thus by modulating the pump laser above this level so that no gain modulation occurs and having a fast detector 3, a phased measurement of the incoming light level can be obtained when the pump is switched off during the on-off modulation referred to above. An appropriate method of imposing a supervisory signal onto the system is therefore to put an amplitude modulated sub-carrier onto the optical data signal (typically 5 gigabit data) and then put phase shifted supervisory data onto the sub-carrier (typically at 500 kHz in order to be above the low frequency roll off to the signal). As a result there is an amplitude modulated signal which can be detected.

Considering FIG. 2, the incoming supervisory carrier tone which is labelled as at frequency $f_1$ (where $f_1$ is well above the low frequency cut off of erbium fibre to signal) is detected at output photodiode 3 and the supervisory command decoded. The pump 6 is modulated at frequency $f_2$. For illustrative purposes $f_2=f_1/4$ but this is not the only possibility. The pump modulation frequency $f_2$ should be sufficiently above the cut-off frequency such that it does not cause gain modulation of the amplifier. Depending on the number of cycles the pump is modulated for (and the amount of energy stored in the fibre) the peak power of the pump may need to be increased in order to keep the gain of the amplifier constant (mean pump power constant). During the part of the cycle when the pump is turned off, the input light level to the amplifier can be measured at input photodiode 11, the mean level in the troughs gives RLL (d.c.), the received light level or integrated optical power at the amplifier input, as the bandwidth of the photodiode receiver 11 can be chosen to be orders of magnitude above the pump chopping rate. Since the pump chopping circuit is local, the measurement can be phased so that RLL is only measured when the pump is turned off, otherwise the pump would swamp the measurement. For the RLL measurement the supervisory carrier is divided down to the lower frequency $f_2$ The tone level of the photodetector 11 output gives a gain reference level at ($f_1$). The peaks show that the photodetector is saturated by the pump.

The send light level SLL (integrated optical power at the output of the fibre amplifier) can be measured by looking at the d.c. photocurrent at photodetector 3. This integrated output power includes the amplified signal, amplified spontaneous emission and residual pump. The mean level of the photodiode 3 output gives SLL (d.c.), the tone level at $f_1$ gives gain and the level at $f_2$ gives the residual pump. SLL as a d.c. monitor provides a simple test that can be used under all conditions.

The gain of the amplifier can be measured by measuring the level of the supervisory carrier signal at the input to the amplifier i.e. at photodetector 11, when the pump is being chopped and the pump is off, and measuring the level of the amplified supervisory carrier at the output i.e. at photodetector 3. The ratio of those two levels gives the gain (linear) of the fibre amplifier. Conventionally the gain is calculated from the integrated input power and the integrated output power but this has a noise offset which leads to inaccuracy. However by performing a lock-in (phase-locked) measurement on a tone as proposed here, the exact gain to signal can be obtained, which is particularly beneficial in situations where there is a significant noise loading on the amplifier and the signal gain is compressed.

Since the fibre amplifier acts as a low pass filter to absorbed pump, any residual pump emerging from the output of the amplifier and measured at photodetector 3 will have the $f_2$ pump modulation on it. The level of this tone can be measured at photodetector 3 and a figure of merit can be calibrated for the residual pump power. This could be calculated on set up of the amplifier.

From the calculated gain of the amplifier, RLL and SLL, the additional noise can be calculated as the difference between the signal output power (input power times gain) and the total output power (SLL). This can also be adjusted for the residual pump power to give a more accurate measurement if required. This calculated difference gives the integrated power in the amplified spontaneous emissions (and residual pump). This is not a direct measure of the noise figure but is a function which will vary with the noise figure and so will give a figure of merit. The signal power at the output (calculated for the noise) may also be measured and returned as a more accurate signal power, during operation only, if desired.

Figure 6:
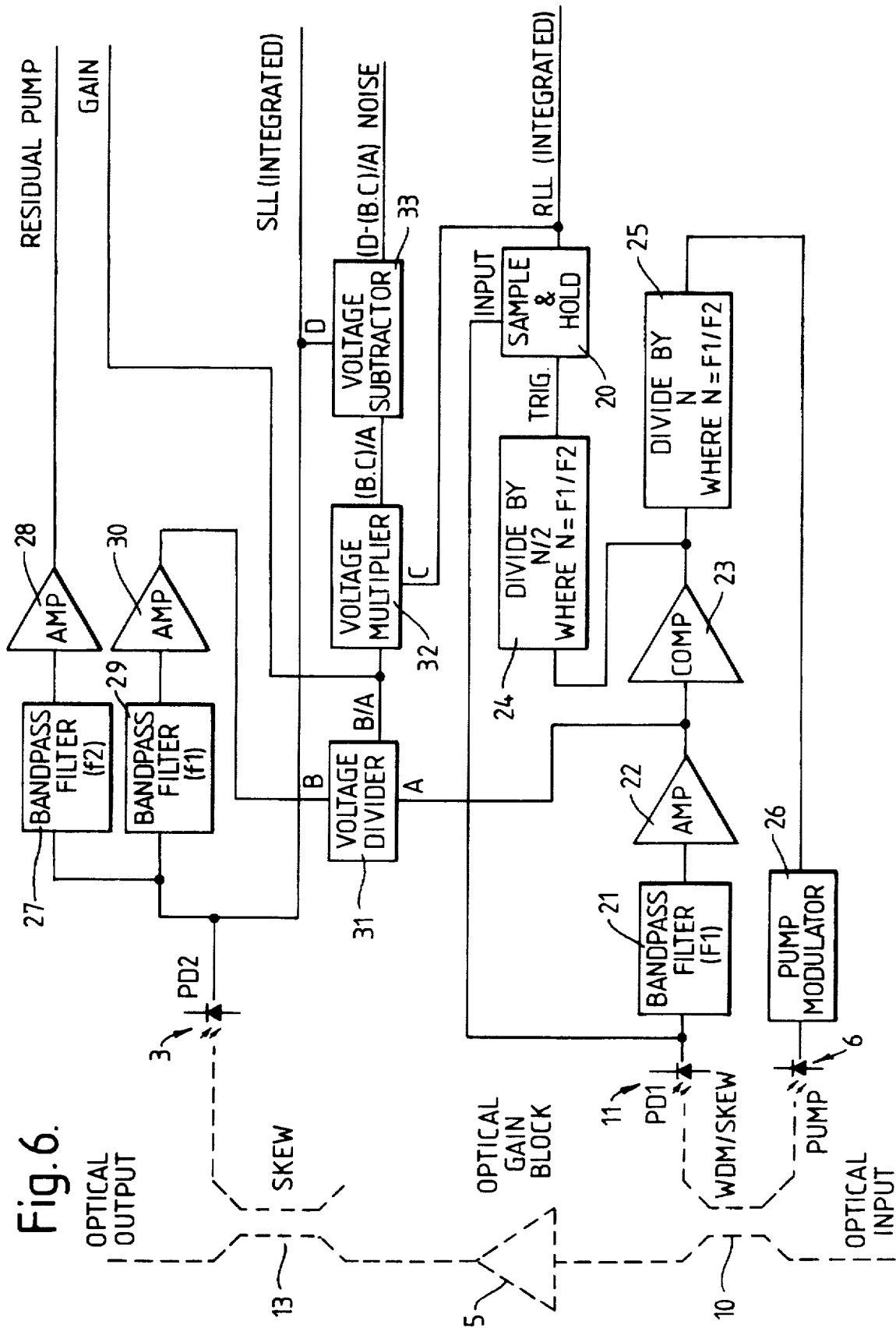
FIG. 6 illustrates the circuitry of the system of FIG. 2 in greater detail.

FIG. 6 indicates more specifically just how the various outputs can be obtained from the outputs of the photodetectors 11 and 3. In order to determine the RLL (integrated) the output of photodetector 11 is applied to the input of a sample and hold circuit 20 and is also applied to a first bandpass filter (centred on frequency $f_1$) 21, amplified by amplifier 22, applied to comparator 23 and applied to a divide by N/2 ($N=f_1/f_2$) divider 24 the output of which latter provides to the required sample point middle to give a trigger for the sample and hold circuit 20, whose output is thus RLL (integrated). The purpose of the comparator 23 is to generate the on-off signal to frequency divide to generate $f_2$ for the pump chopping. The output of the comparator 23 is thus also applied via a divide by N divider 25 to a pump modulator 26. Hence the pump modulation is a derived frequency of the input signal. This avoids the use of a local pump oscillator which has to be switched on and off.

The output of the photodetector 3 is the SLL (integrated). This is applied to a bandpass filter (centred on frequency $f_2$) 27 and a following amplifier 28 to obtain the residual pump. It is also applied to a second bandpass filter (centred on frequency $f_1$) 29 and a following amplifier 30 to produce a signal B corresponding to the level of the supervisory carrier signal at the output. The signal A is the corresponding level of the supervisory carrier signal at the input. Voltage Divider 31 produces an output B/A which is the linear gain of the amplifier. This linear gain B/A is multiplied by voltage multiplier 32 with signal C (RLL (integrated)), the output from sample and hold circuit 20, and subtracted at voltage subtracter 33 from signal D, which is SLL (integrated) as output from photodetector 3, in order to obtain the noise figure of merit referred to above.

The supervisory system described above with respect to FIGS. 2 and 6 thus allows various measurements of the performance of the amplifier to be carried out and these can be sent via the supervisory channel to the end of the line. The following in-service measurements can be made. For these the amplifier is required to be transmitting data (1) RLL (integrated optical power at input)

(2) SLL (integrated optical power at output)

(3) Gain of amplifier (input to output)

(4) Noise—A figure of merit for the optical noise added by the amplifier.

(5) Residual pump—A figure of merit for the un-absorbed pump at the amplifier output.

It should be noted that measurements (1), (2) and (5) (RLL, SLL and residual pump) can be made even if the amplifier does not have data transmission, rather it is addressed from another fibre/amplifier in the overall system.

Figure 7:
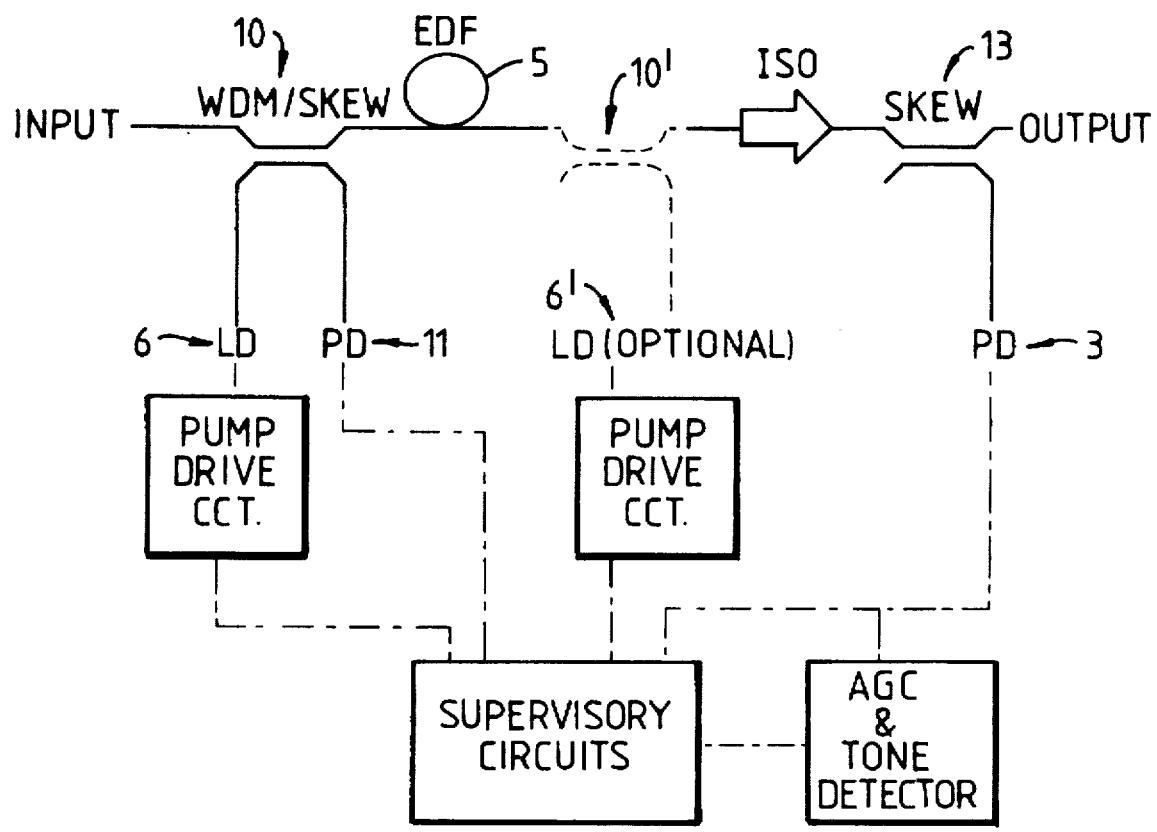
FIG. 7 illustrates the system of FIG. 2 in the format of FIG. 1.

The optical configuration of the amplifier is non-critical, although the drawings assume a co-pump at least. The supervisory measurement system is equally applicable to a counter-pumped amplifier configuration, although the pump chopping would not strictly be necessary for some of the measurements. FIG. 7 illustrates in a format similar to FIG. 1 the arrangement of FIG. 2. The supervisory signal can be tapped out at the output of the amplifier rather than the input. The location does not affect the principle of operation, only the practicality of implementation. The chain dotted lines represent electrical connections.

The measurements which cannot be done in the absence of a data transmission are those which require the gain to be measured i.e. gain and noise. All other measurements can be done under no data input conditions, such that an amplifier on a damaged line may be measured and the results returned via another (operating line). The optical amplifier measurement system described above provides comprehensive monitoring facilities for a remote supervisory system, with the minimum disruption to the optical transmission path and no radically new optical components or optical filters.

A particular feature of the amplifier measurement scheme described above is its ability to measure the noise of any amplifier in a concatenated system and that can be sent back as return data. The system simply requires a supervisory channel into an amplifier using some sort of amplitude modulation and a path out of the amplifier. Quite what the path out of the amplifier is constituted by is not considered to be important. Using current techniques the amplifier pump could be amplitude modulated at say 10 kHz and in this amplitude modulated pump a phase shifted data signal can be disposed, thereby providing a suitable return signal. For very long haul systems, such as trans-Pacific systems, lower noise amplifiers than hitherto will be required and when considering reducing the noise figure for the amplifiers it will be important to be able to measure received light levels accurately. The present application stemmed from such a need to measure received light level (RLL), but as will be appreciated from the above it also enables SLL, residual pump, gain and noise to be measured.

The invention therefore provides a supervisory system to be implemented which provides an accurate, direct measurement of RLL and achieves this using a WDM/SKEW coupler in a co-pumping or bi-pumping configuration. These configurations give the lowest amplifier noise figure and are therefore desirable for optimum transmission performance. Using a WDM/SKEW coupler means that minimum loss at the amplifier is obtainable and by means of the pump chopping technique the input light level (RLL) can be monitored without an optical filter. A secondary benefit of the pump chopping techniques is that it allows measurement of the amplifier residual pump levels.

I claim:

1. An optical fibre communications system including a first transmitter terminal, a second receiver terminal, and an optical transmission path therebetween said transmission path including a repeater incorporating an optical fibre amplifier driven from a pump source coupled to the transmission path via a 2×2 coupler, wherein the transmitter terminal has means for superimposing an intensity modulated supervisory tone at a first frequency (f1) on data signals transmitted from that terminal, wherein the repeater includes;

tone detection means for recovering the supervisory tone;

means for modulating the pump source with the recovered tone so as to intensity modulate signals amplified by the amplifier, a received light level (RLL) detector connected to the coupler and arranged to receive light signals from the pump source and from the transmission path;

sampling means associated with the RLL detector for providing a measure of the received light level;

frequency divider means for deriving a pump control signal frequency (f2) from the supervisory tone, said control signal frequency being less than the supervisory tone frequency;

means for driving the pump source in an on-off chopping manner at the control signal frequency;

and timing means for enabling the sampling means during periods when the pump is off so as to measure the received light level in the absence of pump power.

2. A system as claimed in claim 1 and including a pump source at the output and coupled thereto by a WDM coupler for counter pumping the optical fibre amplifier.

3. A system as claimed in claim 1, and including a further detector at the output and coupled thereto by a SKEW coupler for measuring the send light level (SLL) output by the optical fibre amplifier, the main level detected by the further detector comprising the send light level.

4. A system as claimed in claim 1, wherein said timing means comprises a further frequency divider whose input comprises the recovered supervisory signal frequency and whose output frequency is equal to the control signal frequency.

5. A method of optical transmission and supervision in an optical fibre communications system including a first transmitter terminal, a second receiver terminal, and an optical transmission path therebetween said transmission path including a repeater incorporating an optical fibre amplifier driven from a pump source coupled to the transmission path via a 2×2 coupler; the method comprising;

superimposing at the transmitter terminal an intensity modulated supervisory tone at a first frequency (f1) on data signals transmitted from that terminal;

detecting the supervisory tone at the repeater and modulating the pump source with the recovered tone so as to intensity modulate signals amplified by the amplifier, detecting and measuring via the coupler a received light level (RLL) from the transmission path;

generating a pump control signal frequency (f2) by frequency division from the supervisory tone, said control signal frequency being less than the supervisory tone frequency;

driving the pump source in an on-off chopping manner at the control signal frequency;

and determining the periods when the pump is off and measuring the received light level during those periods and in the absence of pump power.

* * * * *